United States Patent [19]

Sugisawa et al.

[11] Patent Number: 4,516,596
[45] Date of Patent: May 14, 1985

[54] SYSTEM FOR CLEANING A THREE-WAY VALVE

[75] Inventors: Ko Sugisawa; Kazuya Sekiguchi; Masao Taguchi; Masayuki Nakatani; Hitoshi Iwata, all of Higashiosaka, Japan

[73] Assignee: House Food Industrial Company, Ltd., Osaka, Japan

[21] Appl. No.: 623,374

[22] Filed: Jun. 22, 1984

[30] Foreign Application Priority Data

Jun. 22, 1983 [JP] Japan ............... 58-95955[U]

[51] Int. Cl.³ .............................................. B08B 9/06
[52] U.S. Cl. .............................. 137/240; 137/625.46; 137/625.5; 222/148
[58] Field of Search ............... 137/15, 238, 240, 241, 137/271, 625.46, 625.48, 625.5; 134/166 C, 166 R; 222/148; 285/12, 157

[56] References Cited

U.S. PATENT DOCUMENTS

| | | | |
|---|---|---|---|
| 1,826,954 | 10/1931 | Robinson | 285/12 |
| 2,301,976 | 11/1942 | Schellens | 285/157 |
| 2,620,106 | 12/1952 | Weeks et al. | 137/238 |
| 2,789,009 | 4/1957 | Maraccini | 137/15 |
| 3,598,139 | 8/1971 | Boden et al. | 137/240 |
| 4,169,486 | 10/1979 | Otteman et al. | 137/240 |
| 4,182,374 | 1/1980 | Spanides | 137/625.48 |
| 4,295,667 | 10/1981 | Zahs | 285/226 |
| 4,437,686 | 3/1984 | Wingate | 285/12 |
| 4,465,210 | 8/1984 | Iwanami | 137/238 |

Primary Examiner—George L. Walton
Attorney, Agent, or Firm—Weiss & Holloway

[57] ABSTRACT

A system having first, second and third pipes connected respectively to first, second and third ports of a three-way valve. A by-pass pipe is connected at its one end to one of the second and third ports after disconnecting the associated one of the second and third pipes therefrom and at the other end to the other of the second and third pipes prior to the cleaning operation of the system.

6 Claims, 13 Drawing Figures

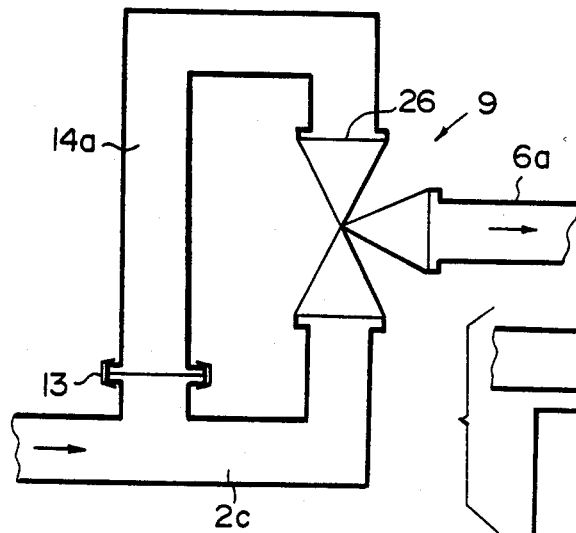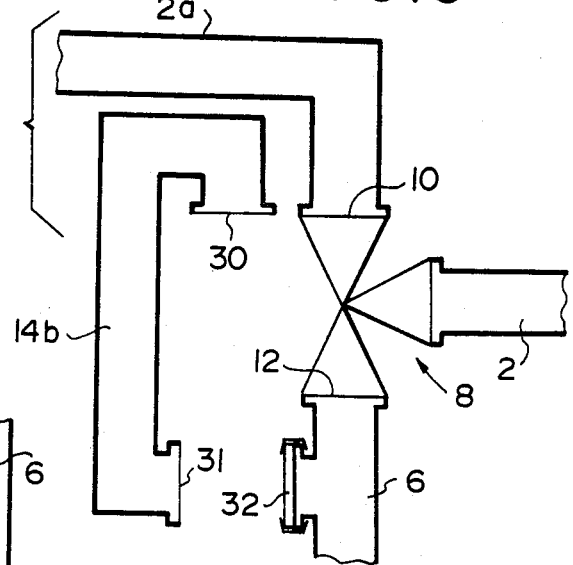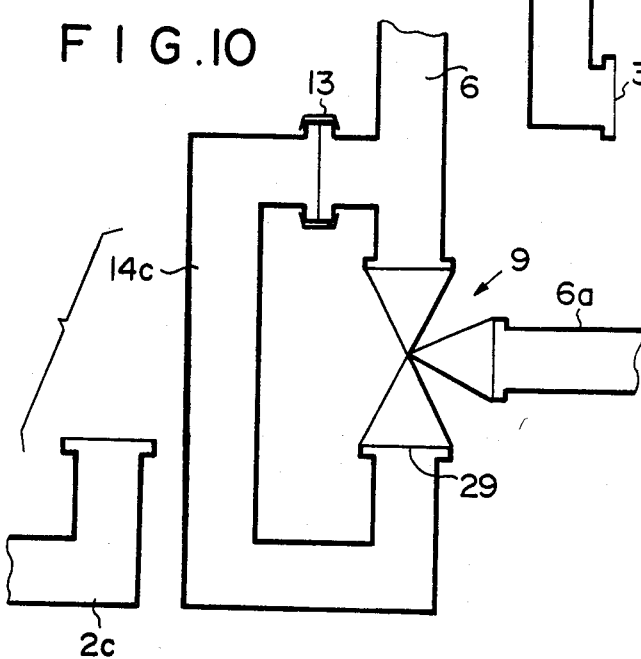

SYSTEM FOR CLEANING A THREE-WAY VALVE

BACKGROUND OF THE INVENTION

The present invention relates to a system for cleaning three-way valves.

Three-way valves are employed in various processes through which a liquid material is passed. A typical example of such processes is a heat-sterilization process for a liquid material such as milk, cream, soup, chowder, or the like and will be described hereinunder with reference to FIG. 1 of the accompanying drawings, which is a flow sheet of the heat-sterilization process for a liquid material wherein a liquid material is transferred by a pump 7 from a material supply tank 1 through a main pipe 2, and a first branch pipe 2a successively to a heat sterilizer 3, storage tank 4, a pipe 2b and a filling machine 5 to become the final product. In the event of a sterilization failure due to a reduction in the sterilization temperature in the sterilization process, the flow of liquid material through the main pipe 2 is returned through pipes 6 and 6a to the material supply tank 1 for a repeating sterilization. To this end, three-way valves 8 and 9 are operated to connect the main pipe 2 to the pipe 6 and to connect the pipe 6 to the pipe 6a.

Usually, this heat sterilization system is cleaned with a separate cleaning fluid, by circulating the cleaning fluid first through the main pipe 2, first branch pipe 2a, pipes 2b, 2c and the pipe 6a while operating the filling machine 5 and a return pump 11, and then through the main pipe 2 and the pipes 6 and 6a. To this end, the three-way valves 8 and 9 are operated in succession to form the above-mentioned flow paths of the cleaning fluid. Namely, for cleaning the flow path constituted by the main pipe 2, first branch pipe 2a, pipes 2b, 2c and the pipe 6a, the three-wave valve 8 is operated to allow the cleaning fluid to flow from the main pipe 2 to the first branch pipe 2a, while the other three-way valve 9 is operated to direct the cleaning fluid from the pipe 2c to the pipe 6a. During the cleaning of the pipes 2, 2a, 2b, 2c and 6a, the three-way valves are kept switched. In consequence, the old liquid material is inevitably left in small gaps between adjacent parts of each three-way valve. For instance, in a compression-type valve 8a as shown in FIG. 2, there is a small gap 27 between a bore in a valve housing and a valve stem 21 to permit the latter to move in the housing bore. During the operation of the system, therefore, the liquid material gradually invades this small gap 27 to deposit or accumulate on the valve stem 21, shaft seal 22 and the inner surface of bore 23 of the valve housing. On the other hand, in the case of a ball-type three-way valve as shown in FIG. 3 in which a ball valve member 24 is adapted to be rotated in a valve housing 25, the liquid material gradually comes into the gap 28 between the valve housing 25 and the ball valve member 24. With the cleaning method described hereinbefore, however, it is almost impossible to perfectly wash-away the old liquid material on these parts or in gaps. In order to perfectly wash the three-way valves, therefore, it is necessary to disassemble the three-way valve to permit the manual cleaning of independent parts. Obviously, this cleaning work is quite troublesome and time-consuming.

Hitherto, it has been proposed to clean the three-way valves with the cleaning fluid by operating repeatedly the three-way valves while circulating the cleaning fluid.

For instance, the following statement is made in ASTM Spec Tech Publ. (Am Soc Test Matter) No. 538 '73.

"All valves are operated 2 to 3 times during precleaning, 4 to 6 times during cleaning and 3 to 4 times during post-cleaning. Thus, every portion of all valves and all parts of the piping system are subjected to mechanical and chemical processings. Consequently, by the operation of the valves, the pre-cleaning fluid or the cleaning fluid is introduced into the gland areas of respective valves thereby to effectively clean the seals, stems and the gland areas."

From this statement, it is understood that the three-way valve 8 of the system shown in FIG. 1 will be capable of being cleaned perfectly with the cleaning fluid by operating repeatedly the three-way valve 8 while circulating the cleaning fluid. However, in the heat-sterilization system of liquid material described above, the repeating operation of the three-way valves 8 and 9 causes the following problems. The cleaning fluid is directed alternatingly to the first branch pipe 2a and the pipe 6 so that the cleaning fluid can flow intermittently through each of these pipes 2a and 6. Namely, when the cleaning fluid is supplied to the pipe 6, the first branch pipe 2a cannot receive the cleaning fluid so that the filling machine 5 and a return pump 11 are made to idle unfavourably.

On the other hand, when the cleaning fluid is circulated through the pipes 2, 2a, 2b, 2c and 6a, the repeating operation of the three-way valve 9 results in intermittent blockade of the flow of the cleaning fluid through the pipe 2c to increase the pressure in the pipe 2c to a considerably high level, thereby incurring various problems such as leak of the cleaning fluid from, for example, the connections of the pipe 2c. At the same time, the return pump 11 and the filling machine 5 are overloaded to suffer from various troubles.

SUMMARY OF THE INVENTION

Accordingly, an object of the invention is to provide a system for cleaning with a separate cleaning fluid a three-way valve incorporated in a system of the type described, while operating repeatedly the three-way valve in a manner of obviating the above-described problems of the prior art.

To this end, according to the invention, there is provided, in a system having first, second and third pipes connected respectively to first, second and third ports of a three-way valve, a system for cleaning the three-way valve comprising a by-pass pipe adapted to be connected at its one end to one of the second and third ports after disconnecting the associated one of the second and third pipes therefrom and at its other end to the other of the second and third pipes, whereby a cleaning fluid can be made to flow in either direction between and only between the first pipe and the other of the second and third pipes depending on the position of the valve.

The above and other objects, features and advantages of the invention will become more apparent from the following description of the preferred embodiments taken in conjunction with the accompanying drawings.

BRIEF DESCRIPTION OF THE DRAWINGS

FIG. 6 is an illustration of the compression-type three-way valve which is being cleaned;

FIG. 7 is an illustration of the ball-type three-way valve which is being cleaned;

FIG. 8 is a schematic illustration of a cleaning by-pass pipe in the state of use for cleaning a three-way valve;

FIG. 9 is a schematic illustration of a three-way valve in the state of use for passing a liquid material therethrough; and FIG. 10 is a schematic illustration of a cleaning by-pass pipe in the state of use for cleaning a three-way valve.

DESCRIPTION OF PREFERRED EMBODIMENT

Figure 1:
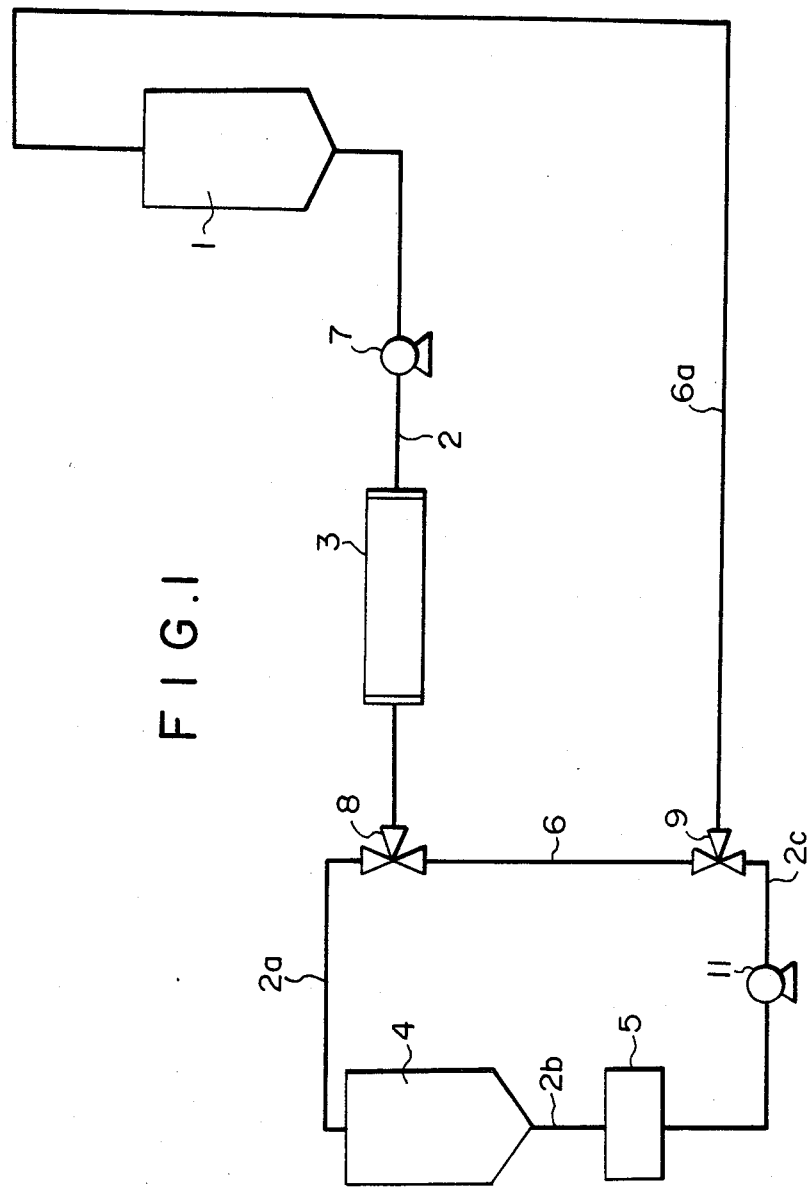
FIG. 1 is a flow chart of a heat-sterilization system for sterilizing a liquid material.
Figure 2:
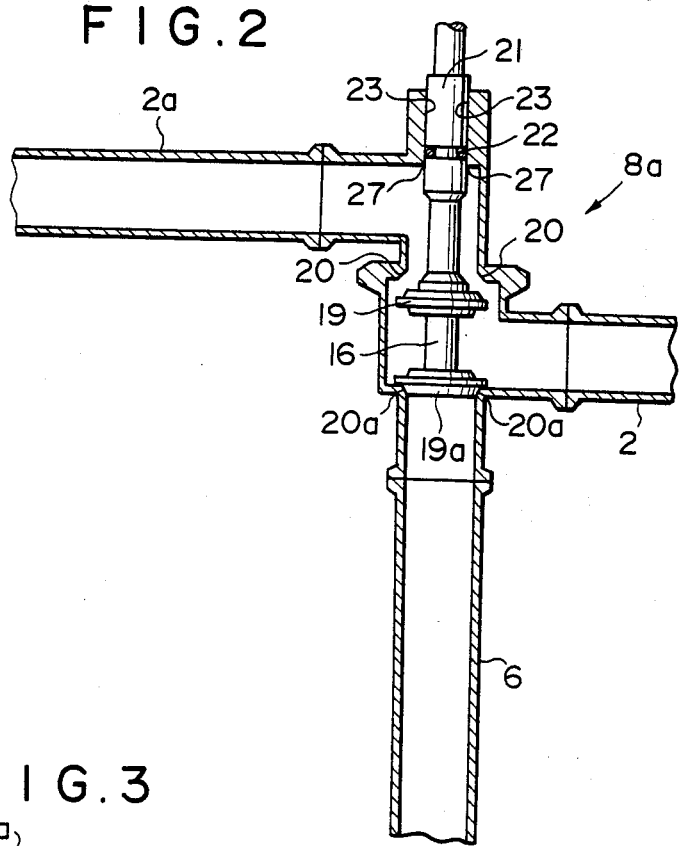
FIG. 2 is a sectional view of a compression-type three-way valve.
Figure 3:
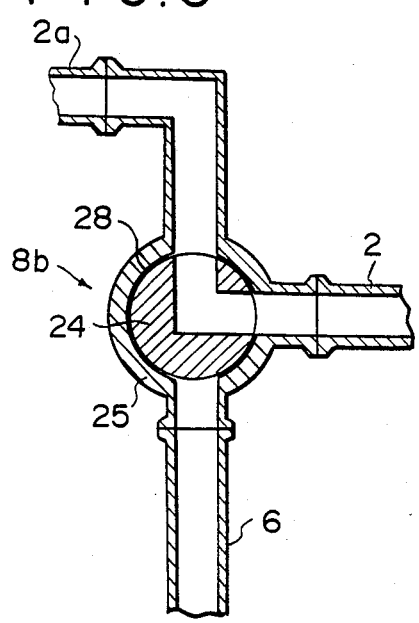
FIG. 3 is a sectional view of a ball-type three-way valve.

An embodiment of the invention will be described hereinbelow in connection with a three-way valve 8 incorporated in the system shown in FIG. 1. This three-way valve 8 functions to direct a liquid material from the main pipe to a selected one of two branch pipes connected thereto.

Figure 4:
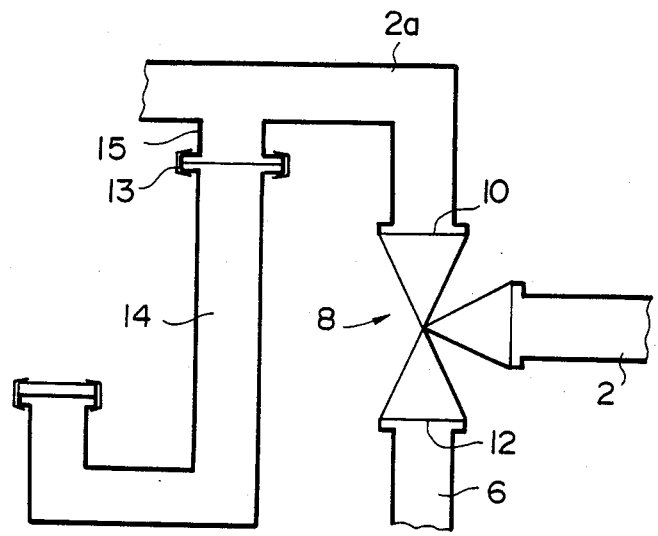
FIG. 4 is a schematic illustration of a three-way valve passing a liquid material therethrough, with a cleaning by-pass pipe in the out-of-use position.
Figure 5:
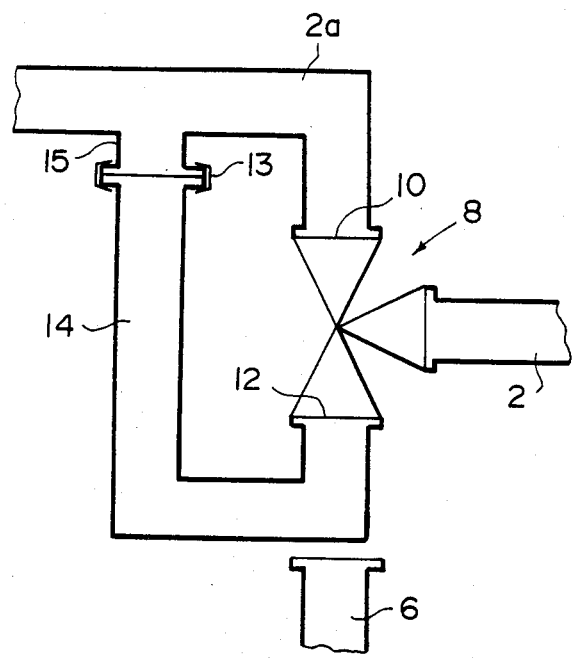
FIG. 5 is a schematic illustration of the three-way valve with the cleaning by-pass pipe in the cleaning position.

FIG. 4 schematically shows a cleaning by-pass pipe 14 in its inoperative position relative to the three-way valve 8, while FIG. 5 shows the cleaning by-pass pipe 14 in the operative position, i.e., the cleaning position where the three-way valve 8 is cleaned.

Referring first to FIG. 4, the three-way valve 8 is connected at its first port to the main pipe 2. A first branch pipe 2a is connected to a second port 10 of the three-way valve 8 while a second branch pipe 6 is removably connected to a third port 12 of the valve 8. The cleaning system of the invention includes a by-pass pipe 14 which may be always connected to a T-piece 15 of the first branch pipe 2a by means of a clamp 13 or may be held apart from the same. In either case, when the by-pass pipe 14 is not in use, the T-piece 15 of the pipe 2a or the end of the by-pass pipe 14 is covered with a closure plate (not shown). In the case, where the by-pass pipe 14 is connected to the T-piece 15, prior to cleaning operation, the by-pass 14 is rotated relative to the T-piece 15 and connected to the port 12, after disconnecting the pipe 6 from the latter. Thus, the by-pass pipe 14 provides a fluid communication between the first branch pipe 2a and the port 12. The three-way valve 8 is operated to direct the cleaning fluid from the main pipe 2 through the port 10 into the first branch pipe 2a. After elapse of a predetermined time, the three-way valve 8 is switched to direct the cleaning fluid from the main pipe 2 through the port 12 and the by-pass pipe 14 into the first branch pipe 2a. Then, after a predetermined time has elapsed, the three-way valve 8 is operated for passage of the cleaning fluid from the main pipe 2 through the port 10 into the first branch pipe 2a. This operation is repeated during circulation of the cleaning fluid through the system. It will be understood that the cleaning fluid is continuously supplied to the first branch pipe 2a although the three-way valve 8 is operated repeatedly, so that the liquid path including the first branch pipe 2a, storage tank 4, pipes 2b, 2c and filling machine 5, and return pump 11 are cleaned sufficiently with the cleaning fluid, without causing the filling machine 5 and the return pump 11 to idle. In addition, the internal parts of the three-way valve 8 such as the valve member or members, valve seats, shafts, shaft seals and so forth are cleaned thanks to the repeating operation of the three-way valve 8.

Preferably, the operation of the three-way valve is made quickly in order to substantially eliminate the fluctuation of flow rate of the liquid supplied to the first branch pipe 2a. Consequently, the system which is designed on an assumption that the flow rate of the cleaning fluid is constant can be cleaned quite efficiently.

A description will be made hereinunder as to how perfectly the three-way valve 8 is cleaned with the cleaning fluid, on each case of the compression-type three-way valve and the ball-type three-way valve.

Figure 6A:
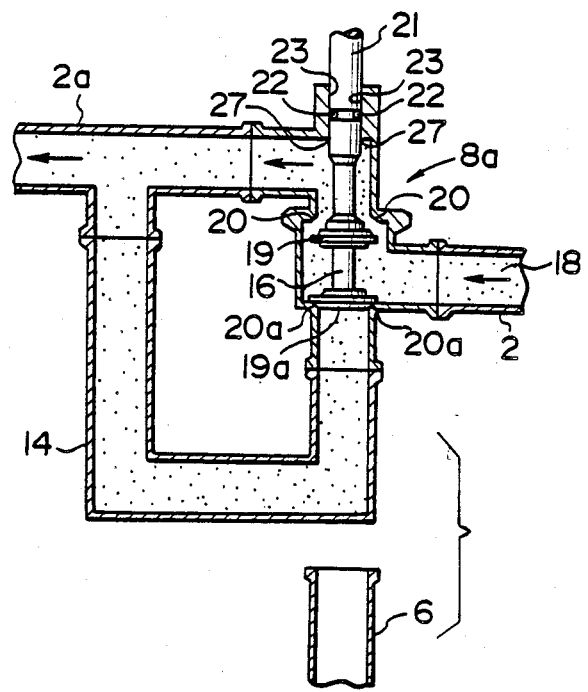
FIG. 6a is an illustration of the compression-type three-way valve which is being cleaned showing a valve stem in a position which allows cleaning fluid to flow from a main pipe into a first branch pipe.
Figure 6B:
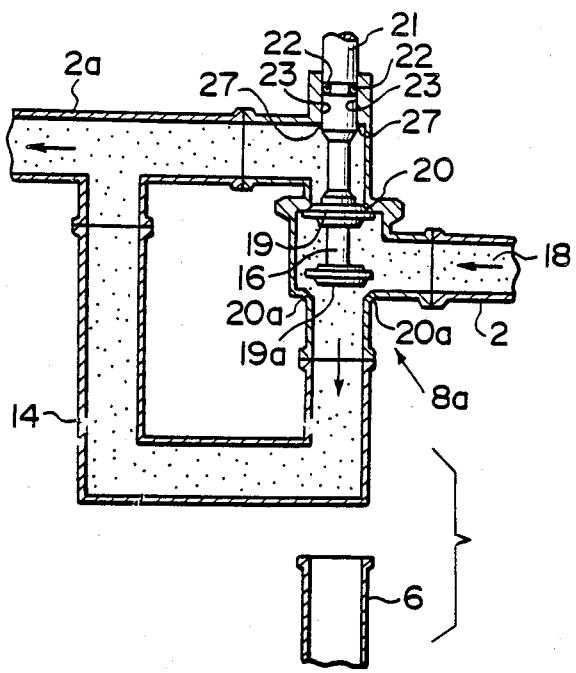
FIG. 6b is an illustration of the compression-type three-way valve which is being cleaned showing the valve stem in a position which allows cleaning fluid to flow from the main pipe through the by-pass pipe and into the first branch pipe.

Referring first to FIG. 6 a three-way valve 8a which is compression-type three-way valve, is operated by moving vertically the valve stem 21 between the position shown in FIG. 6a and the position shown in FIG. 6b. By this operation, it is possible to expel the liquid material from the gap 27 between the valve stem 21 and the sliding bore 23 of the valve housing and to clean the gap 27 with cleaning fluid. In consequence, the parts of this three-way valve including a valve stem 21, shaft seal 22, and sliding bore 23 are cleaned perfectly. Other parts of the compression-type three-way valve 8a are also cleaned effectively. Namely, when the valve stem 21 is in the position shown in FIG. 6a, the cleaning fluid 18 flows from the main pipe 2 through the compression-type three-way valve 8a into the first branch pipe 2a to completely clean the valve shaft 16, valve member 19 and the valve seat 20. To the contrary, when the valve stem 21 is in the position as shown in FIG. 6b, the cleaning fluid 18 flows form the main pipe 2 through the compression-type three-way valve 8a and by-pass pipe 14 into the first branch pipe 2a to clean the valve shaft 16, valve member 19a and the valve seat 20. During circulation of the cleaning fluid, the repeating operation of the compression-type valve 8a makes it possible to perfectly clean all parts of the compression-type three-way valve 8a with the cleaning fluid.

Figure 7A:
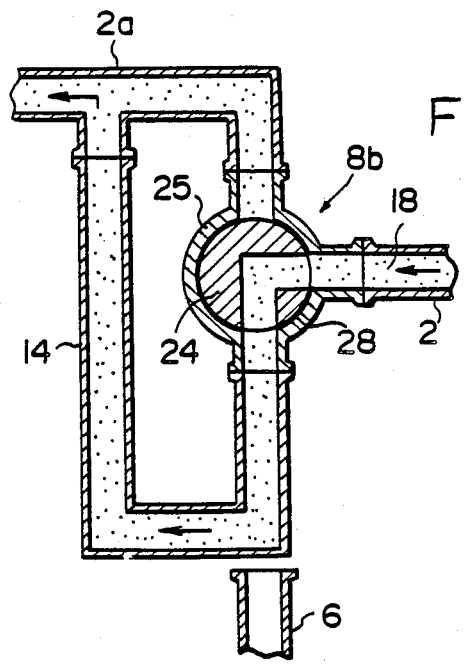
FIG. 7a is an illustration of the ball-type three-way valve which is being cleaned showing a ball valve member in a position which allows cleaning fluid to flow from the main pipe through the by-pass pipe and into the first branch pipe.
Figure 7B:
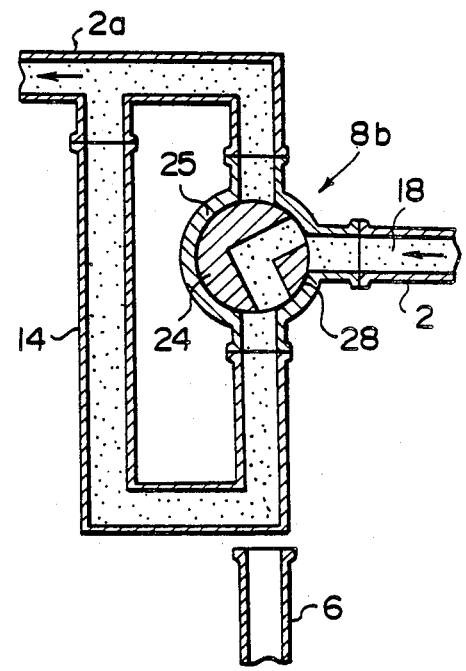
FIG. 7b is an illustration of the ball-type three-way valve showing the ball valve member in a position which causes cleaning fluid to impinge upon the surface of the ball valve member.
Figure 7C:
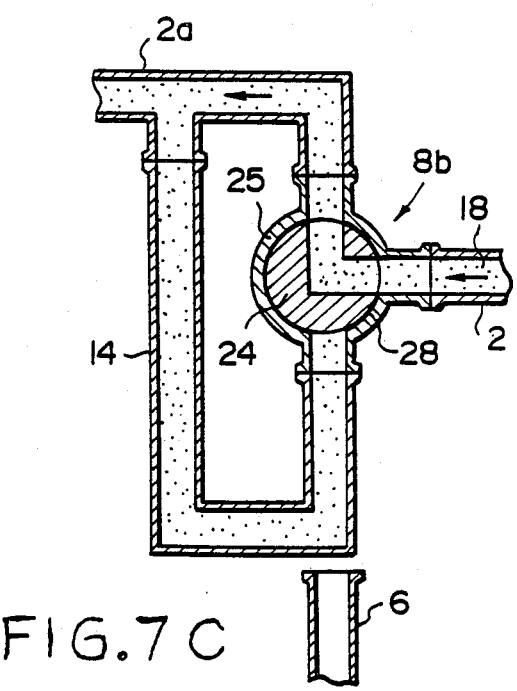
FIG. 7c is an illustration of the ball-type three-way valve which is being cleaned showing the ball valve member in a position which allows cleaning fluid to flow from the main pipe into the first branch pipe.

In the case of a ball-type three-way valve 8b as shown in FIG. 7, the ball valve member 24 is repeatedly rotationally operated to successively take the positions shown in FIGS. 7a, 7b and 7c for cleaning of all portions of the ball-type three-way valve 8b. Namely, when the ball-type valve member 24 is in the position shown in FIG. 7b, the cleaning liquid 18 impinges upon the surface of the ball valve member 24, thereby effectively cleaning the surface of the ball valve member 24. During rotation of the ball valve member 24 within the valve housing 25, the liquid material stagnant in the gap 28 between the ball valve member 24 and the ball valve housing 25 is expelled from this gap. It will be understood that the repeating operation of the ball-type three-way valve 8b causes the cleaning fluid from the pipe 2 to repeatedly impinge upon the surface of the valve member 24 to clear it and permits a penetration of the cleaning liquid into the gap 28, thereby effectively cleaning the gap 28. Consequently, it is possible to perfectly clean the ball-type three-way valve 8b with the cleaning fluid.

Although the three-way valve 8b shown in FIG. 7 has an L-shaped fluid passage formed in the ball valve member 24, the fluid passage can be of any of other forms such as Y, T and the like.

After cleaning the first branch pipe 2a and the three-way valve 8, the by-pass pipe 14 is disconnected from the port 12 and the second branch pipe 6 is connected to the port 12. Subsequently, the three-way valve 8 is operated to direct the cleaning liquid from the main pipe to the second branch pipe 6 so that the cleaning liquid flows through the second branch pipe 6 to clean the inner surface of the latter. The operation of the three-way valve 8 during the cleaning of the second branch pipe 6 is not essential. According to the invention, it is thus possible to perfectly clean the three-way valve 8, as well as the pipes 2, 2a, 2b, 2c and 6, while permitting passage of the cleaning fluid through the return pump 11 and the filling machine 5.

An explanation will be given hereinbelow as to the cleaning of the three-way valve 9 shown in FIG. 1 with reference to FIG. 8, the second branch pipe 6 is disconnected from the port 26 of the three-way valve 9 and the by-pass pipe 14a is connected at its one end to the same port 26 instead and at the other to the pipe 2c. In consequence, a closed path is formed to include the main pipe 2, first branch pipe 2a, pipe 2b, pipe 2c and the pipe 6a. While the cleaning liquid is circulated through this closed path, the three-way valve 9 is operated repeatedly so as to be cleaned perfectly for the same reason as stated before in connection with the three-way valve 8. The continuous flow of the cleaning liquid through the pipe 2c is established during the cleaning not to induce abnormal high pressure in the pipe 2c which would result in unfavourable effects such as a leak of the cleaning liquid from the connections of the pipes, overloading of the return pump 11 and the filling machine 5 and so forth.

The cleaning system of the invention can be applied also to the case where only one of the branch pipes connected to the three-way valve need be cleaned or a case where the supply of the cleaning liquid to one of the branch pipes is prohibited. As an example of the former case, it is to be understood that the second branch pipe 6 need not be cleaned when nos sterilization failure has occurred in the heat-sterilization system shown in FIG. 1. In this case, therefore, the cleaning fluid is circulated through the main pipe 2, three-way valve 8, first branch pipe 2a, storage tank 4, pipe 2b, filling machine 5, pipe 2c, return pump 11, three-way valve 9 and the pipe 6a operating repeatedly.

As an example of the latter case, it is required to clean the sterilizer 3, liquid supply pump 7, main pipe 2, second branch pipe 6, three-way valves 8, 9 and the pipe 6a since the liquid material from the supply tank 1 has been stored in the storage tank 4 after sterilization of the liquid material by the sterilizer 3.

An embodiment of the invention, suitable for the cleaning of the three-way valve in such a case, will be explained hereinunder with reference to FIG. 9. The three-way valve 8 is connected to the main pipe 2 as in the case of preceding embodiments. However, the first branch pipe 2a is removably connected to the port 10 of the three-way valve 8, while the second branch pipe 6 is connected to the port 12. This embodiment employs a by-pass pipe 14b which may be always connected to the second branch pipe 6 at a point indicated at 32 as is the case of the by-pass pipe 14 of the first embodiment or may be separated from the second branch pipe 6 as shown in FIG. 9. In either case, a closure member is suitably attached to the by-pass pipe 14b at its one end 30 or the connecting portion 32 of the pipe 6 so as to prevent the liquid material from flowing out of the pipe 6. Prior to cleaning of the three-way valve 8, the first branch pipe 2a is disconnected from the port 10. The end 30 of the by-pass pipe 14 is connected, instead, to the same port 10 and the other end 31 of the by-pass pipe 14b is connected to the connecting portion 32 of the second branch pipe 6 so that the port 10 communicates through the by-pass pipe 14b with the second branch pipe 6. Therefore, the cleaning liquid is continuously supplied from the main pipe 2 through the three-way valve 8 into the second branch pipe 6 regardless of the position of the valve. The three-way valve 8 is first operated to direct the cleaning fluid from the main pipe 2 to the port 12. After a while, the three-way valve 8 is operated to direct the cleaning fluid from the main pipe 2 to the port 10, so that the cleaning fluid flows through the by-pass pipe 14 into the second branch pipe 6. After a while, the three-way valve 8 is operated again to direct the cleaning fluid from the main pipe 2 to the second branch pipe 6 via the port 12. The same operation is repeated until the three-way valve 8 is cleaned perfectly with the cleaning fluid while the cleaning fluid is continuously supplied from the main pipe 2 to the second branch pipe 6. Consequently, during the cleaning operation of the three-way valve 8, the liquid material from the storage tank 4 is passed through the filling machine 5 for filling operation.

An explanation will be made hereinunder with specific reference to FIG. 10 as to the method of cleaning the three-way valve 9 incorporated in the system shown in FIG. 1. At the first step, the pipe 2c is disconnected from the port 29 of the three-way valve 9 and a by-pass pipe 14c is connected, instead, to the port 29 to provide a communication between the port 29 and the second branch pipe 6. Then, repeating operation of the three-way valve 9 is effected while the cleaning fluid is circulated through the main pipe 2, pipe 6 and the pipe 6a so that the three-way valve 9 is cleaned completely with the cleaning fluid. Namely, in this case, the cleaning fluid flows constantly from the second branch pipe 6 direct or through the by-pass pipe 14c to the pipe 6a and the same cleaning effect as that on the three-way valve 8 is produced.

As has been described, according to the invention, it is possible to clean the three-way valve with the cleaning fluid by repeatedly operating the same, so that a perfect cleaning of the three-way valve can be conducted without requiring the troublesome and time-consuming disassembling of the three-way valve.

Needless to say, the main and branch pipes connected to the three-way valve are also cleaned simultaneously with cleaning of the three-way valve.

As has been described, according to the invention, it is possible to conduct the cleaning without producing any unfavourable effect on the equipments and pipes in a system which transfers a liquid material. In addition, the invention can be applied to the case where either one of the branch pipes does not necessitate the cleaning and the case where the supply of the cleaning fluid to either one of the branch pipes is prohibited.

The invention offers an advantage also from the view point of economy, because the perfect cleaning of three-way valve can be accomplished by use of a simple by-pass pipe.

Although the invention has been described with reference to a heat-sterilization system, it will be apparent to those skilled in the art that the invention can be applied to any other system which transfers a liquid material through a three-way valve.

We claim:

1. In a system having first, second and third pipes connected respectively to first, second and third ports of a three-way valve; a system for cleaning said three-way valve comprising a by-pass pipe adapted to be connected at its one end to one of the second and third ports after disconnecting the associated one of the second and third pipes therefrom and at its other end to the other of the second and third pipes, whereby a cleaning fluid can be made to flow in either direction between and only between said first pipe and said other of the second and third pipes depending on the position of the valve.

2. A system for cleaning a three-way valve according to claim 1, wherein said three-way valve is a compression-type valve.

3. A system for cleaning a three-way valve according to claim 1, wherein said three-way valve is a ball-type valve.

4. A system for cleaning a three-way valve according to claim 1, wherein said three-way valve is incorporated in a system for heat-sterilization of a liquid material.

5. A system for cleaning a three-way valve according to claim 2, wherein said three-way valve is incorporated in a system for heat-sterilization of a liquid material.

6. A system for cleaning a three-way valve according to claim 3, wherein said three-way valve is incorporated in a system for heat-sterilization of a liquid material.

* * * * *